(12) United States Patent
Esemann et al.

(10) Patent No.: US 8,329,302 B2
(45) Date of Patent: Dec. 11, 2012

(54) GLASS OR GLASS-CERAMIC ARTICLES WITH DECORATIVE COATING

(75) Inventors: Hauke Esemann, Woerrstadt (DE); Gerhard Weber, Bechenheim (DE); Gabriele Roemer-Scheuermann, Ingelheim (DE); Michael Kluge, Offenbach (DE); Joerg Schuhmacher, Kornwestheim (DE); Silke Knoche, Budenheim (DE); Axel Kalleder, Blieskastel (DE); Andrea Anton, Hueffelsheim (DE)

(73) Assignee: Schott AG (DE)

( * ) Notice: Subject to any disclaimer, the term of this patent is extended or adjusted under 35 U.S.C. 154(b) by 665 days.

(21) Appl. No.: 11/911,713

(22) PCT Filed: Apr. 19, 2006

(86) PCT No.: PCT/EP2006/003567
§ 371 (c)(1),
(2), (4) Date: Jan. 13, 2009

(87) PCT Pub. No.: WO2006/111359
PCT Pub. Date: Oct. 26, 2006

(65) Prior Publication Data
US 2009/0233082 A1    Sep. 17, 2009

(30) Foreign Application Priority Data
Apr. 19, 2005 (DE) .................. 10 2005 018 246

(51) Int. Cl.
*B32B 15/04* (2006.01)
*B32B 17/06* (2006.01)

(52) U.S. Cl. .............. 428/432; 428/426; 428/304.4; 428/690

(58) Field of Classification Search .............. 428/426, 428/429, 432, 304.4, 688, 690
See application file for complete search history.

(56) References Cited

U.S. PATENT DOCUMENTS

| 4,822,685 | A | * | 4/1989 | Perez et al. ............ 428/423.3 |
| 5,541,248 | A | * | 7/1996 | Haluska et al. ............ 524/420 |
| 5,585,136 | A | | 12/1996 | Barrow et al. |
| 5,716,424 | A | | 2/1998 | Mennig et al. |
| 5,731,091 | A | | 3/1998 | Schmidt et al. |

(Continued)

FOREIGN PATENT DOCUMENTS

DE    42 00 449 C1    3/1993

(Continued)

OTHER PUBLICATIONS

"German Office Action for German Application No. 10 2005 018 246.1", dated Feb. 16, 2011, Publisher: German Patent Office, Published in: DE.

(Continued)

*Primary Examiner* — Jennifer McNeil
*Assistant Examiner* — Lauren Robinson
(74) *Attorney, Agent, or Firm* — Kaplan Breyer Schwarz & Ottesen, LLP

(57) ABSTRACT

In order to provide a decorative coating (9) which exhibits improved temperature resistance and strength on glass and glass-ceramic and which also has no strength-reducing effect on the substrate (3), or at least no longer has any substantially strength-reducing effect on the substrate, the invention envisions a process for producing glass or glass-ceramic articles having a decorative layer in which at least one decorative pigment (13) is mixed with a sol-gel binder (11), and the pigment mixed with the sol-gel binder is cured on the glass or glass-ceramic substrate of the article by annealing, to form a decorative layer having a porous ceramiclike structure.

7 Claims, 3 Drawing Sheets

U.S. PATENT DOCUMENTS

Figure 1:
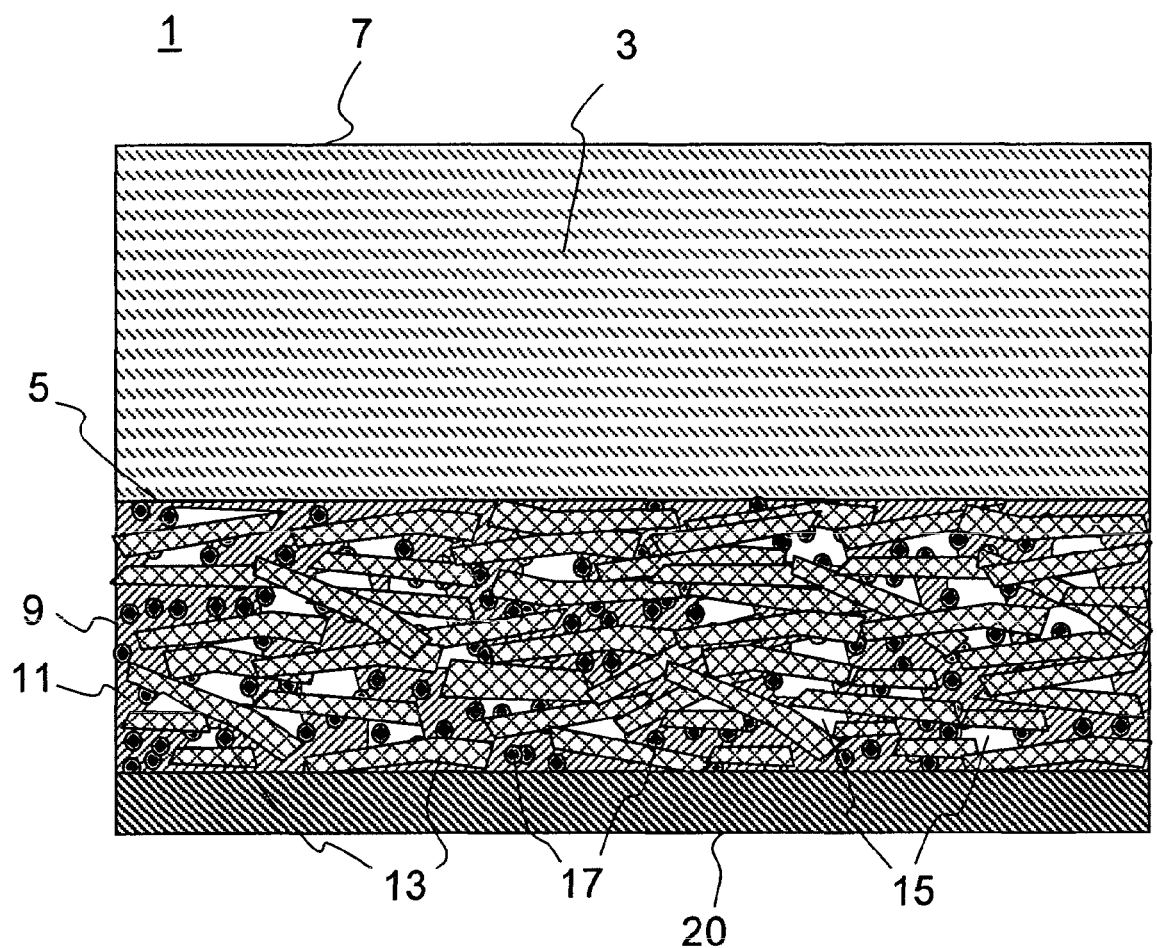

| | | |
|---|---|---|
| 6,399,229 B1 | 6/2002 | Takeda et al. |
| 2003/0006231 A1 | 1/2003 | Nagata et al. |
| 2006/0191625 A1* | 8/2006 | Kapp et al. ............ 156/99 |
| 2007/0017402 A1* | 1/2007 | Jordens et al. .......... 101/491 |
| 2008/0139375 A1 | 6/2008 | Wennemann et al. |

FOREIGN PATENT DOCUMENTS

| | | |
|---|---|---|
| DE | 102 23 531 A1 | 12/2003 |
| DE | 103 13 630 A1 | 10/2004 |
| EP | 1 416 227 A2 | 5/2004 |
| JP | 10297938 A | 11/1998 |
| JP | 2000-256041 A | 9/2000 |
| WO | 0172087 A1 | 9/2001 |

OTHER PUBLICATIONS

International Preliminary Examination Report.

Zhang Huashan, "Chinese Office Action for International Application No. 200680017307.6", Jun. 12, 2010, Publisher: Chinese Patent Office, Published in: CN.

Mertins, Frederic, "EP Application No. 06 724 422.8 Office Action Oct. 11, 2011", , Publisher: EPO, Published in: EP.

Japanese Office Action, dated May 31, 2012 of Japanese Patent Application No. 2008-506994.

\* cited by examiner

Fig. 5
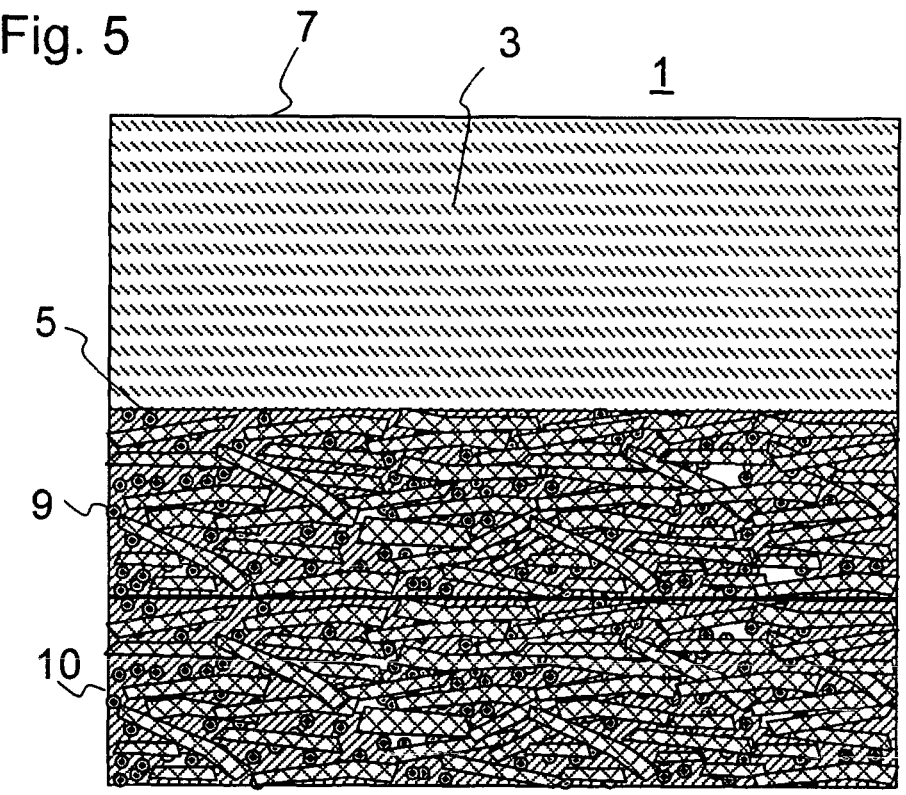
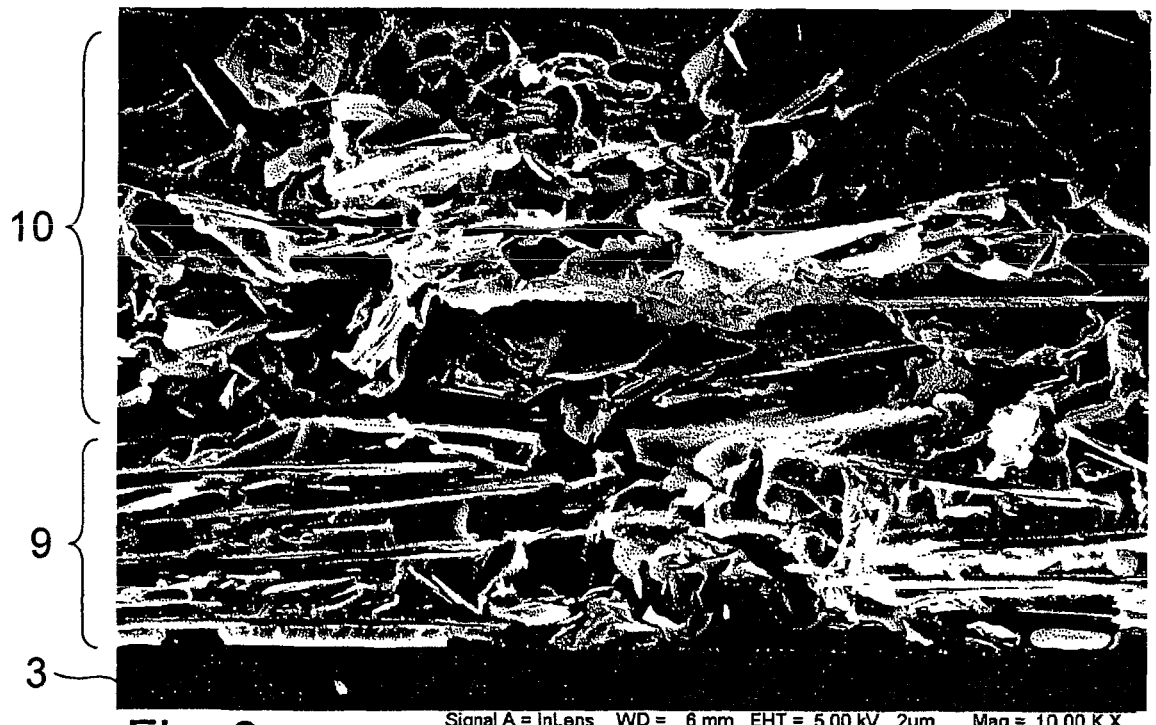
Fig. 6

GLASS OR GLASS-CERAMIC ARTICLES WITH DECORATIVE COATING

The invention relates in general to decorative coatings; more particularly the invention relates to coatings of this kind on glass or glass-ceramic.

Articles made of glass or more particularly of glass-ceramic are widely used in hot environments. A particular instance of this is the use of glass-ceramic as a cooktop. A utility of this kind imposes special requirements on decorative coatings. The decorative coatings must long withstand the temperatures to which they are exposed, and which may amount to several hundred degrees, in order to give a serviceable article.

For a number of years to an increased extent there have been efforts to use cooking surfaces which in contrast to the conventional glass-ceramic cooking surface, which is transparent and bulk-dyed and hence has a black or dark effect, employ a transparent glass-ceramic which is not bulk-colored. Transparent, nonbulk-colored cooking surfaces of this kind are to be used at increased levels on design grounds, since in this way it becomes possible, for example, to integrate high-resolution displays and also to realize diverse color effects and visual appearances. For the realization of colored, nonreflecting opaque coatings, the use of pigmented coatings is particularly advantageous.

The production of pigmented layers has long been known for the marking of the cooking zones, and for writing on the top face of the glass-ceramic. It is in this context that flux-based layers are employed. For producing opaque layers, however, particularly on the bottom face of a glass-ceramic, flux-based layers of this kind are unsuitable, since they cannot be used to achieve sufficient opacity if at the same time the intention is to ensure a level of glass strength that is sufficient for technical applications, as a glass-ceramic hob, for example. In contrast to this, silicone-based coatings can be used to obtain glass-ceramics which, with skillful formulation, do not substantially interfere with the requisite high level of glass strength. With silicone-based layers, however, discoloration may occur under temperature load, which is unacceptable in the context of use as a decorative layer for, for example, a glass-ceramic hob. An alternative both to flux-based and to silicone-based pigmented layers is represented by sol-gel layers. Pigmented sol-gel layers are known from DE 10313630 A1, for example. These layers do not attack the strength of the glass to the same degree as, say, flux-based layers, and in addition are also markedly more colorfast than silicone-based colors. With sol-gel-based colors it is possible to obtain coated substrates in which the layers are sufficiently opaque.

EP 0729442 discloses a process for producing functional vitreous layers on substrates where the layers are produced using a composition obtainable by hydrolysis and polycondensation of silanes, organosilanes, and also, where appropriate, from compounds of glass-forming elements, and by mixing with function carriers. The function carriers may be temperature-stable dyes or pigments, metal oxides or nonmetal oxides, coloring metal ions, and also metal colloids or metal-compound colloids which react under reducing conditions to give metal colloids. The composition mixed with the function carrier is then applied to the substrate and then densified thermally to form a vitreous layer.

EP 1218202, furthermore, discloses a process for producing printed substrates by imagewise application to the substrate of a printing paste with a matrix-forming condensate which is obtained by the sol-gel process and is based on polyorganosilanes, and of one or more coloring, luminescent, conductive and/or catalytically active fillers, and by densification by means of heat treatment. This densification is carried out at a temperature which is lower than the glass transition temperature of the matrix which forms.

Both processes, accordingly, produce layers having a vitreous matrix. Layers of this kind are in general comparatively dense, being dense in particular to permeation, and are then also able to prevent penetration by extraneous substances. This too is an important aspect, since such substances may alter the appearance of the layers or may even attack the underlying substrate. Nevertheless, the formation of a vitreous layer requires a low pigment fraction. Because of the low pigment fraction, however, thick layers are then needed in order to achieve a desired optical effect, such as the appearance of brushed stainless steel, for example. The need for these thick layers may in turn be disadvantageous owing not least to the typical difference in coefficients of thermal expansion between substrate and coating. If the substrate is used in a high-temperature environment, as for example in the form of a coated glass-ceramic cooktop, the solid vitreous layer may flake or rupture under the cyclical temperature loading that occurs. There may also be a reduction in the strength of the substrate.

It is an object of the invention, therefore, to provide a decorative coating which on glass and glass-ceramic exhibits improved temperature resistance and strength and which also has no strength-reducing effect, or at least no longer has any substantial strength-reducing effect, on the substrate. By not substantially strength-reducing is meant, in the present invention, that the coating improves the strength of the glass or affects it not at all or only to a degree such that the statutory requirements of the product, such as of a glass-ceramic hob, for example, are still met in their entirety.

This object is already achieved in a most surprisingly simple way by the subject matter of the independent claims. Advantageous embodiments and developments of the invention are specified in the dependent claims.

The invention accordingly provides a process for producing glass or glass-ceramic articles having a decorative layer, in which at least one decorative pigment is mixed with preferably just a small amount of a sol-gel binder, and the pigment or pigments mixed with the sol-gel binder, following application to the glass or glass-ceramic substrate of the article, are cured by annealing to form a decorative layer having a porous, preferably nanoporous, ceramiclike structure. Hence the route taken is different from that proposed in EP 1218202 or EP 0729442, for instance.

In the case of the composition of the invention the sol-gel binder and the pigment or pigments do not form vitreous layers; instead, in contradistinction thereto, the layer is porous, or pore-containing, and ceramiclike. It has surprisingly emerged that in this way the layer becomes more elastic and, consequently, differences in coefficients of temperature expansion between substrate and decorative layer can be compensated. In this way as well the flaking of the decorative layer and/or the development of strength-reducing microcracks in the decorative layer or the substrate is avoided.

A ceramiclike structure for the purposes of the invention is a layer structure which is inorganic, all in all nonmetallic in the sense of metallic conductivity, and more particularly is predominantly polycrystalline. This is not, however, to rule out the possibility of small regions in the layer, or small layer fractions, such as in the cured sol-gel binder, for example, also still having an amorphous structure. A sol-gel binder in addition, for the purposes of the invention, is a sol-gel which serves as a binder for the other constituents of the layer, more particularly for the pigments.

Alternatively or additionally a decorative layer of the invention can also be described as a decorative layer with a cured sol-gel binder, in which the predominant fraction of the layer volume is formed by fillers and/or pigment particles.

The high fraction of pigment particles means that a layer of this kind can be significantly thinner than opaque pigment layers known to date. The layer thickness is preferably not more than 70 micrometers, but is generally much lower. As a result of the low layer thickness the effect on the strength of the coated article is no more than slight. In addition, thermal stresses on heating are reduced.

On glass-ceramic in particular it is generally problematic to apply durable, firmly adhering layers which withstand even a high temperature load, of the kind occurring in the operation, for example, of a cooktop, for a prolonged time, and at the same time are not substantially strength-reducing. One of the reasons for this is the low temperature expansion of the glass-ceramic. It has been found, however, that the layers of the invention with a high pigment fraction meet these requirements.

A glass or glass-ceramic article with decoration, producible in particular with the process of the invention, accordingly comprises a glass or glass-ceramic substrate having a decorative layer, the decorative layer comprising a porous, more particularly nanoporous, ceramiclike structure with pigments and a cured sol-gel binder.

The curing process that occurs in the course of annealing is generally accompanied, advantageously, by densification of the sol-gel binder and, overall, in tandem with this, results in a denser and stronger structure of the layer.

With particular preference the sol-gel binder and the decorative pigment or pigments and any further components are premixed, and then the resulting mixture is applied to the substrate, the coating thus applied then being subsequently cured by annealing to form the completed decorative layer with its porous, ceramiclike structure. This is particularly advantageous in order to achieve thorough mixing of the individual constituents for the decorative layer.

In order to achieve a desired consistency of the mixed components, it is also possible to add further components to the mixture as well, such as fillers, solvents or additives. For the purposes of the invention the term "solvent" also embraces a dispersion medium for the particles of the sol.

The sol-gel binder is preferably prepared from a sol which is generated in a hydrolysis reaction and subsequent condensation reaction involving reaction of at least one hydrolyzable organometallic compound, more particularly an organic silicon compound, in alcoholic solution, for example, with water, to form silica or organic silica derivatives, or else organically substituted silica. By an organometallic compound is meant here, in simplified form, either an organometallic compound or a metal organyl.

According to one preferred development the sol-gel binder or the sol comprises at least partly organometallic compounds, more particularly organic silicon compounds, in which one or more organic radicals remain attached after the hydrolysis. In this way the cured sol-gel binder comprises organic constituents attached to a metal oxide network, preferably an $SiO_2$ network. The organic radicals or constituents in this case may advantageously improve, for example, water repellency properties of the decorative layer.

Surprisingly, such decorative layers are sufficiently temperature-resistant to be able to be used for glass or glass-ceramic articles which are subject repeatedly to high temperatures. Among the applications in mind here are coated glass-ceramic cooktops. In order for attached organic radicals to remain in the completed decorative layer, the sol or the sol-gel binder may comprise, for example, a trialkoxyalkylsilane, more particularly triethoxymethylsilane (TEMS). Preferably the sol-gel binder is prepared from a tetraethoxysilane (TEOS)-based and/or a TEMS-based sol. With particular preference a sol with both constituents is used. To prepare the sol, then, triethoxymethylsilane and tetraethoxysilane can be mixed, that mixture mixed with water and a preferably small amount of an acid, and also, if appropriate, a solvent, and the two mixtures reacted in order to give the sol or sol-gel binder.

When the sol has been prepared, as described above, for example, and has been added to the pigments and, where appropriate, fillers which substantially determine the ceramiclike layer, then the sol-gel binder can be generated, with at least partial volatilization of sol solvent added and/or formed during the reaction. This triggers an accelerated condensation reaction, and a gel with a metal oxide network is formed. The sol may in particular comprise the alcohol, formed during the hydrolysis and/or added, as its solvent or dispersion medium, which then undergoes volatilization. The volatilization of the solvent is preferably performed after the application of the layer to the glass or glass-ceramic substrate. In the course of the subsequent annealing, residual water, and/or alcohol, is then eliminated from the sol-gel binder, with formation of the solid metal oxide framework, more particularly an $SiO_2$ or organomodified $SiO_2$ framework.

If, for example, triethoxymethylsilane and/or tetraethoxysilane are/is used for the sol-gel binder, then $SiO_2$, or methyl-substituted $SiO_2$, is formed as the metal oxide framework in the cured sol-gel binder of the completed decorative layer. This is generally preferred not only on account of the ease of processing of silanes; additionally, in this way the layer achieves a good barrier effect.

In order to achieve the advantageous properties of the decorative layer, porosity and ceramiclike structure, the decorative layer is with particular preference produced in such a way that the weight fraction of pigments and any fillers is higher than the weight fraction of the solidified and cured sol-gel binder. As their predominant constituent, therefore, layers of this kind comprise pigments and, where appropriate, fillers, which then are no longer embedded in a vitreous matrix, in the manner known from the prior art, but instead are held together by small amounts of cured sol-gel. The fraction of sol-gel binder in this case is preferably not more than 40, preferably 30 percent by weight, more preferably not more than 20 percent by weight in the layer. If the proportion of the fractions of sol-gel binder to the other fractions of the layer, more particularly fillers and pigments, is expressed as a volume percentage, the resulting values may be different, since the volume fraction depends on the density of the constituents used.

The volume fraction of the sol-gel binder in the solidified or completed layer is preferably not more than 40%.

If a sol-gel binder is employed that contains silicon oxide, then the weight fraction of the sol-gel binder, calculated as $SiO_2$, is advantageously not more than 25% of the total mass of the layer, preferably not more than 20% of the total mass of the layer, in order to generate a porous layer of this kind, with a ceramiclike structure, that is sufficiently elastic.

Pigments used are more preferably effect pigments. The effects in mind here are, in particular, metallic effects, such as the appearance of brushed metal, for instance. This embodiment of the invention fits in particularly well in terms of appearance with the stainless steel which is appreciated and in widespread use in the kitchen sector, more particularly brushed or otherwise roughened stainless steel. For this purpose the decorative pigment may comprise flakelike pigment particles. Particularly suitable flakelike pigments for obtaining metallic effects are, for example, mica flakes, more particularly coated mica flakes, and/or metal flakes, such as aluminum flakes, for example.

In a further embodiment it is possible for luminescent pigments or what are called luminous phosphors to be employed, such as, for example, $YVO_4:Eu^{3+}$, $Y_2O_4:Eu^{3+}$, $LaPO_4:Ce^{3+}$, $Tb^{3+}$ and $BaMg_2Al_{16}O_{27}:Eu^{2+}$. Also possible is the use of afterglow pigments with an afterglow duration of >1 sec, such as $ZnS:Cu$ or $SrAl_2O_4:Eu^{2+}$, for example. These materials make it possible to produce new design effects and decoration variants. Given that these materials are excited by a combination of light and heat, it is possible to give particular marking to warm or hot regions of a glass or glass-ceramic plate coated in this way, which increases product safety to the user, as in the case of cooktops, for example.

A particular advantage for the optical activity of the pigment in the layer in this case is obtained by using mica flakes coated with high-index metal oxides. Effect pigments with other temperature-resistant materials as well, such as with glass particles, for instance, can be used, depending on the optical effect that is to be achieved.

An unordered arrangement of such pigments produces only a weak metal effect, of the kind that occurs in metallic paints, for example. However, it has been found that a metallic appearance in the manner of gently roughened or brushed metal can be achieved if the flakelike particles are oriented predominantly parallel to the surface of the glass or glass-ceramic substrate. If this is achieved it is also found, surprisingly, that decorative coatings of this kind are significantly more resistant, in particular more resistant to abrasion and scratching. It has also emerged, surprisingly, that such orientation can be achieved through the addition of at least one filler. Particularly good orientation is possible in particular with fillers having spherical particles. Such a filler may comprise, for example, fumed silica, which forms small spherical particles. It has additionally proven favorable for the properties of the decorative layer to add colloidally disperse $SiO_2$ particles as a filler to the coating composition. In particular it has proven favorable for the filler fraction not to exceed 40 percent by weight of the mass of the pigment—more particularly flakelike pigment—or pigments in the coating composition. Preference is given to adding fillers in the form of colloidally disperse $SiO_2$ particles and/or fumed silica particles with a fraction in each case not more than 20 percent by weight of the mass of the pigment—in particular flakelike pigment—or pigments. Colloidally disperse $SiO_2$ particles, or $SiO_2$ particles from a colloid dispersion, may differ in size from fumed silica particles, the presence of both kinds of filler particles having proven particularly favorable for the properties of the layer and/or of the substrate, such as their strength, for instance.

As a result of the sol-gel process, the ceramiclike, porous layer structure of the decorative layer may form even well below the sintering temperature of the layer constituents used, more particularly the pigments and fillers. Heating the layer to this temperature, which might lead, for example, to the elimination of organic constituents or changes to the substrate, is therefore unnecessary. In order to accelerate the elimination of water and/or alcohol and the formation of a metal oxide framework, more particularly an $SiO_2$ framework, however, annealing at a temperature of at least 200° C. is preferred.

A further measure for obtaining a coating which is color-fast even after prolonged temperature exposure is to use an inorganic thickener such as organomodified phyllosilicates or silicas for the formula. Adding such a thickener, preferably silica, allows the rheology of the paste produced to be set in such a way that it can be applied uniformly, by means of screenprinting or knife coating, for example, without visible tracks occurring in the layer. Inorganic thickeners which have proven suitable in this context, in place of the otherwise commonly used organic thickeners, such as the cellulose known from DE 10313630 A1, include more particularly fumed silica and/or colloidal $SiO_2$ particles. The addition of fumed silica and/or colloidal $SiO_2$ particles brings with it a multiple benefit. Firstly filler particles of this kind interact with flakelike pigment particles, which on addition of these particles enter into increased orientation parallel to the coated surface; secondly it is possible at the same time to adjust the rheology of the paste produced therewith. Furthermore, the fumed silica is highly temperature-stable and prevents stronger discoloration which may occur when organic thickeners are employed.

Yet another advantage of an inorganic thickener, such as fumed silica in particular, is its improved acid stability. Because of the acid added as a catalyst for the hydrolysis and condensation, a paste thickened, accordingly, with cellulose or a cellulose derivative would have only a very short durability in the sol-gel, and would have to be processed very rapidly after its preparation. In contrast, a paste thickened inventively with fumed silica is stable on storage.

In comparison with metallic coatings an advantage of the decorative pigmented sol-gel layers is that they do not exhibit conductivity and hence can also be employed when the desire is to combine such a coating with touch sensors, as in the case of a cooktop with underside coating, for example.

Although it has emerged that the decorative layer of the invention is very resistant, possessing acid resistance, for example, and even provides a certain barrier effect for the protection of the substrate, this can nevertheless be improved further if an additional seal is applied to the decorative layer. In order to achieve improved water repellency, the decorative layer can be sealed using, for example, silicones. With sealing of this kind on the reverse face, any possible discoloration has no disruptive effect, owing to the surface being opaque as a result of the high pigment content of the layers of the invention. They also provide a sealing effect with respect to oily substances, comestibles for example, which may come into contact with the decorative layer in the course of the use of a cooktop designed in accordance with the invention.

By depositing a metal oxide-based layer, more particularly an $SiO_2$-based layer, on the decorative layer it is possible, moreover, to bring about a distinct improvement in the barrier effect. Techniques suitable for this purpose include sputtering, chemical vapor-phase deposition, such as, in particular, plasma-induced chemical vapor-phase deposition or pyrolytic deposition, from flame or corona, for example. The latter has the advantage that the process need not take place in a vacuum. Also possible, however, is deposition by vapor deposition, for example. The additional barrier layer may also be produced advantageously, furthermore, like the decorative layer, by means of a sol-gel coating. In this case the sol-gel formula may be modified or at its most simple may be the same formula as that of the first layer, with or without addition of pigments and/or fillers. In this way it can be produced using the same apparatus as for the production of the decorative layer.

An additional barrier layer of this kind is especially advantageous if the glass or glass-ceramic article is combustion-heated. This is the case, for example, with gas-heated glass-ceramic cooktops. A problem which occurs here is that sulfur oxides may be one of the products of the combustion. Together with water, which is likewise a product of the combustion, these oxides react to form acid. This acid in turn may attack the glass-ceramic. With the decorative layer in conjunction with the sealing, however, it is possible in accordance with the invention to create not only a visually appealing appearance but also, furthermore, an article of enhanced durability.

Generally speaking, particularly on glass-ceramic, a two-layer construction is particularly preferred in order to achieve better adhesion and layer stability on the glass-ceramic, which is otherwise more problematic for coatings. In this case it is possible in particular to apply a further sol-gel-based layer atop a first inventive coating. In the simplest scenario the same formula or a similar one is used for the second layer. Accordingly, with this development of the invention, a further layer is applied to the substrate, at least one decorative pigment being mixed with a sol-gel binder in the case of said layer, and the pigment mixed with the sol-gel binder is cured on the glass or glass-ceramic substrate of the article by annealing to form a layer with a porous ceramiclike structure.

A two-layer construction of this kind has proven to be a way of obtaining particularly advantageous coating properties overall. In particular it has emerged that the adhesion of the layer assembly can surprisingly be improved even further overall if the two layers are fired at different temperatures, more particularly if the first layer is fired at a higher temperature than during the annealing of the second layer applied subsequently. It has proven particularly advantageous in this context for the first layer to be fired at a temperature which is at least at times at least 350° C., and the second layer at a temperature of not more than 300° C. Preferably the further layer also comprises pigments. In particular it is also possible to apply the same formula, or mixture, as that used for the first layer. Multiple application of the mixture in this way, preferably with annealing in between, is particularly simple to accomplish. With multiple application of a pigmented sol-gel-based coating of the invention, accordingly, a glass or glass-ceramic article is obtained which has a multilayer, preferably two-layer, decorative layer. A sufficient overall thickness for a double layer of this kind is generally likewise 70 micrometers at most, in order to produce an opaque coating.

In order to obtain a smooth, robust surface and to protect the decorative layer from wear, the decorative layer in the case of a glass-ceramic cooktop is disposed preferably on the underside. It has surprisingly emerged that the decorative layer can even cover a heating zone of the cooktop, since it is sufficiently thermoconductive and temperature-resistant. A cooktop can be operated even with a decorative layer containing effect pigments, such as mica flakes or similar metal-effect pigments, for instance, in the region of the heating zones, which create a nontransparent layer.

According to one development of the invention, apart from full-area application of the decorative layer, the decorative layer can also be applied with lateral structuring to the substrate. This can be done, for example, by means of suitable printing techniques, such as screenprinting. For this purpose it is possible in particular to apply a decorative layer that does not cover the full area. In this case, for example, different regions, such as windows for sensors or displays, for instance, can be kept free from the decorative layer. Another possibility is to combine a plurality of coatings, differing in composition and/or color and/or appearance, with one another. For this purpose it is possible advantageously to provide different regions of the surface of the substrate with decorative layers that differ in appearance and/or color.

An inventive coating of this kind has been found, moreover, not to be substantially strength-reducing. The strength of the article thus coated may even be higher as compared with the uncoated article. In any case, according to one embodiment of the invention, the fracture strength of a coated article is reduced by not more than 5% as compared with an uncoated article. If, for example, a spring hammer test is carried out in accordance with standard IEC 60068-2-75 or EN 60335-1, and if indeed the coated article is not stronger than the uncoated article, the resulting reduction in the average force on the spring hammer to fracture is not more than 5%.

In the text below, the invention is illustrated with reference to working examples and to the drawings, with identical and similar elements carrying the same reference symbols, and the features of different working examples being combinable with one another.

Figure 4:
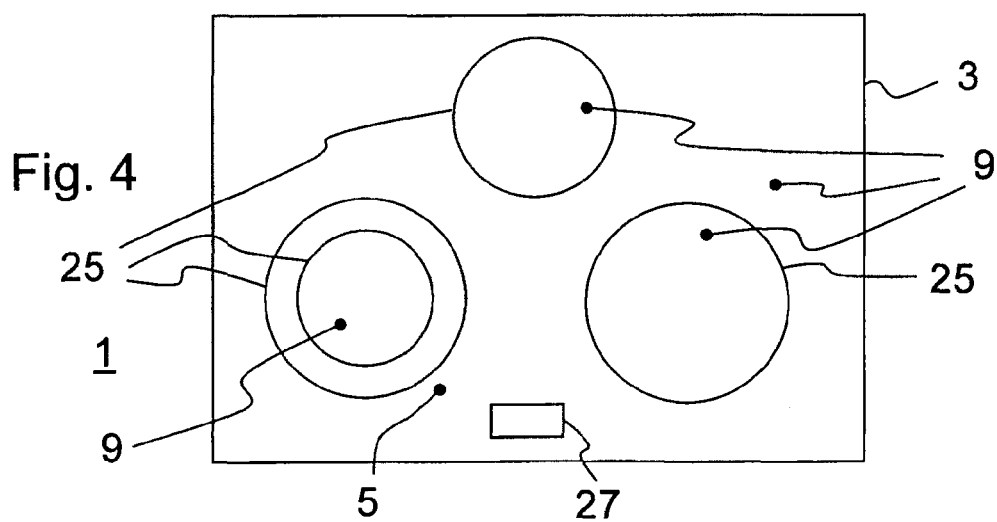
Figure 2:
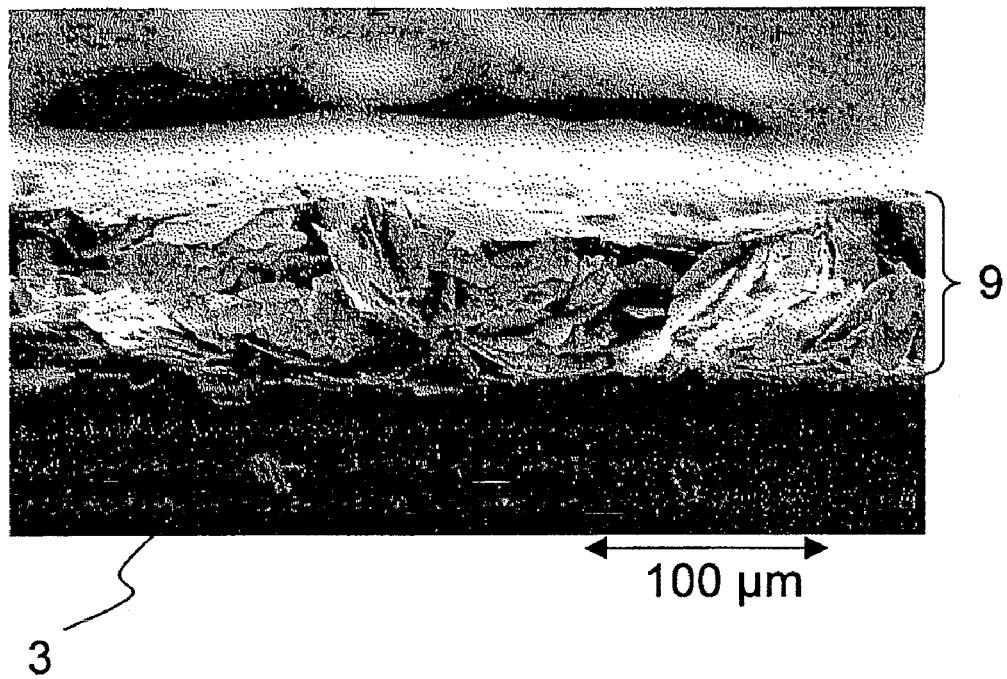
Figure 3:
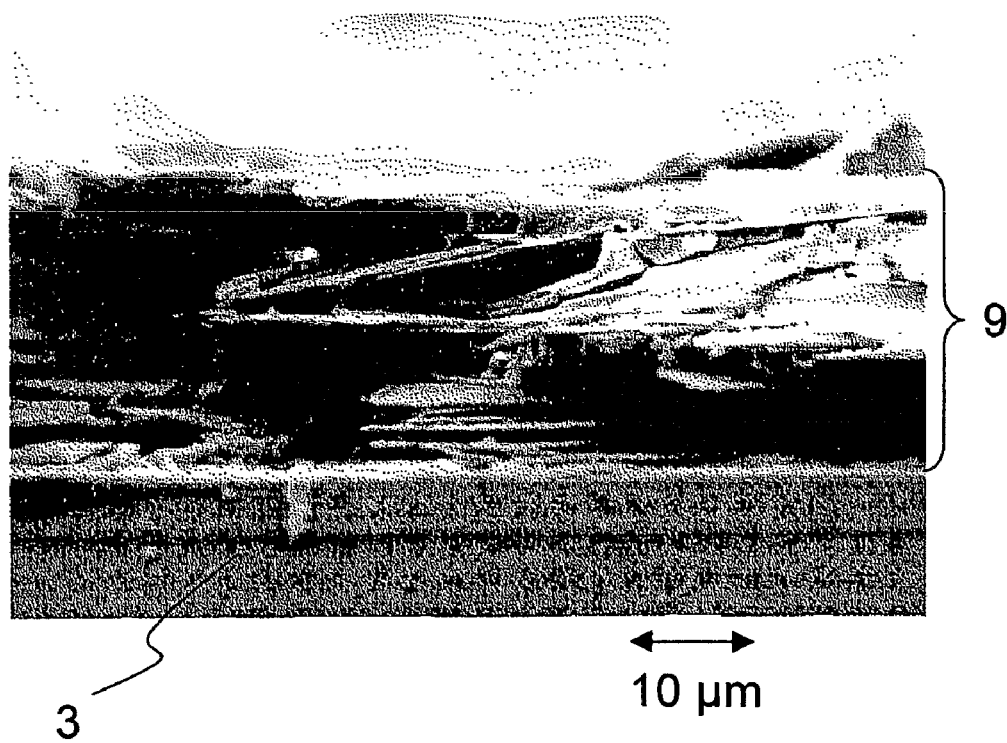

FIG. 1 shows a diagrammatic cross-section through a glass or glass-ceramic substrate with an inventive decorative layer, FIGS. 2 and 3 show electron micrographs of decorative layers without and with addition of fillers, FIG. 4 shows a plan view of an inventively coated glass-ceramic cooktop, FIG. 5 shows a variant of the embodiment example shown in FIG. 1, with a two-layer decorative coating, and FIG. 6 shows an electron micrograph of a two-layer decorative coating.

FIG. 1 depicts a diagrammatic cross-section through an inventive glass or glass-ceramic article 1 with a decorative layer. In this example the glass or glass-ceramic article 1 comprises a glass or glass-ceramic substrate 3 with sides 5 and 7. The article 1 may in particular be a glass-ceramic cooktop. On the side 5 of the substrate 3 an inventive decorative layer 9 has been applied. If the article 1 is a glass-ceramic cooktop, then the decorative layer 9 is applied with particular preference on the underside of the cooktop, in order to prevent wear to the layer as a result of use.

To produce the decorative layer 9, decorative pigment is mixed with a sol-gel binder and the pigment mixed with the sol-gel binder is cured on the glass or glass-ceramic substrate 3 of the article 1 by annealing to form the decorative layer 9. In accordance with the invention no vitreous layer, in which the pigments are included in a matrix, is formed in this case; instead, a layer having a porous ceramiclike structure is formed. The layer 9, accordingly, is predominantly polycrystalline.

In order to obtain a metal effect, the decorative pigment in this example comprises flakelike pigment particles 13. For this purpose it is possible to use an effect pigment which comprises mica flakes, more particularly coated mica flakes. A further possibility are metal flake pigments, such as aluminum flake pigments and/or pigments with glass particles, in particular. Mica pigments and other effect pigments with temperature-resistant materials, such as glass, for instance, are preferred, however, on account of their high temperature resistance.

As well the pigment particles 13 there are also filler particles 17 present in the layer 9. The filler particles 17 and decorative-pigment particles 13 are joined by a sol-gel binder 11 to form a solid layer, the weight fraction of pigment particle 13 and filler particles 17 being higher than the weight fraction of the solidified and cured sol-gel binder 11. In the case of a decorative layer 9 as shown in FIG. 1, the fraction of sol-gel binder 11 is preferably not more than 40 percent by weight, preferably not more than 30 percent by weight, with particular preference not more than 20 percent by weight of the total mass of the layer. As a result of the high solids fraction, or of the low fraction of sol-gel binder 11, pores 15 then remain. The layer, with its overall porosity, proves to be significantly more flexible than vitreous decorative layers, thereby allowing compensation of differences in the coefficient of temperature expansion between substrate 3 and layer 9. It is also possible, in contradistinction to what is depicted in FIG. 1, for pores to be formed between the filler particles and pigment particles, these pores then being partly filled with cured sol-gel binder.

With particular preference the sol-gel binder is prepared from a sol based on tetraethoxysilane and on triethoxymethylsilane. Triethoxymethylsilane is an organic silicon compound in which, after hydrolysis and condensation, and also in particular in the completed decorative layer 9, an organic radical remains attached. This is favorable in order to produce a decorative layer which in spite of its porosity is water-repellent. Moreover, the organic constituents enhance the flexibility of the layer.

The coating operation in this case is performed preferably as follows:

A mixture is prepared with TEOS and TEMS. Alcohol may serve as additional solvent. Furthermore, an aqueous metal oxide dispersion, more particularly an $SiO_2$ dispersion in the form of colloidally disperse $SiO_2$ particles, is mixed with hydrochloric acid. In addition, for the purpose of homogenization, the two mixtures can be stirred. Both mixtures are then mixed together. This composition may then advantageously age for a certain time, approximately one hour, for example, in order to produce the sol, preferably with stirring. In parallel with the preparation of this composition, the pigments and any other filler can be weighed out and these solids fractions can then be added to the composition and dispersed. It is preferred to add fumed silica as a filler. In the completed layer 9, the fumed silica and/or the colloidal $SiO_2$ dispersion form spherical filler particles. The fraction of fillers in the form of colloidally disperse $SiO_2$ particles and additionally added fillers such as fumed silica amounts in each case to less than 20 percent by weight of the mass of the flakelike pigment or pigments. The weight fraction of filler particles 17 overall in this case is preferably not more than 40 percent by weight of the weight fraction of the pigment particles 13. The fumed silica and/or the $SiO_2$ particles of the colloidal $SiO_2$ dispersion serve, moreover, to set the desired viscosity of the applied paste, and hence serve simultaneously as a high-temperature-resistant rheological additive or as a high-temperature-resistant thickener.

Depending on the way in which the composition is applied to the substrate, different solvents, rheological additives, and other adjuvants can be added to the mixture.

As a result of volatilization of the alcohol and as a result of condensation reaction on the part of the hydrolyzed TEOS and TEMS, the sol is transformed into a sol-gel binder in the form of a metal oxide gel. This operation is accelerated in particular after the application of the composition to the substrate, so that the layer solidifies with formation of the gel. In this case, in particular, with TEOS and TEMS, an $SiO_2$ network is formed, more particularly an at least partly methyl-substituted $SiO_2$ network.

Subsequently the substrate 3 is annealed together with the presolidified layer 9, the reaction to form the $SiO_2$ network being finished in the course of annealing. The annealing, in order to accelerate the reaction, is carried out preferably at a temperature of at least 200° C. Annealing is also accompanied by densification of the layer 9. In the layer 9 with its solidification completed, the weight fraction of the sol-gel binder 11, calculated as $SiO_2$, is then not more than 25% of the total mass of the layer, preferably not more than 20% of the total mass of the layer.

In the case of the embodiment example depicted in FIG. 1, moreover, the flakelike pigment particles 13 are oriented predominantly parallel to the surface 5 of the substrate 3. This does not mean that the faces of the flakes run strictly parallel to the surface of the substrate. Instead it is intended to express the fact that the angular distribution of the surface normal of the pigment particles is not stochastic, but instead exhibits a distinct maximum in the direction of the surface normal of the substrate surface. It has emerged, surprisingly, that this effect can be achieved with particular ease through the use of the above-described fillers featuring spherical filler particles 17.

Additionally or alternatively to the flakelike pigments it is also possible for luminescent pigments, or what are called luminous phosphors, such as $YVO_4:Eu^{3+}$, $Y_2O_4:Eu^{3+}$, $LaPO_4:Ce^{3+}$, $Tb^{3+}$, and $BaMg_2Al_{16}O_{27}:Eu^{2+}$, for example, to be added.

FIGS. 2 and 3 show, for comparison, electron micrographs of a layer without fillers (FIG. 2) and a layer with fillers (FIG. 3). In the case of the layer without fillers there is a virtually unordered arrangement of the mica flakes of the effect pigment in the layer 9. In contrast, in FIG. 3, an exemplary embodiment is shown in which fillers in the form of spherical $SiO_2$ particles have been added to the composition for the layer 9. Clearly apparent here is the orientation of the mica flakes of the effect pigment virtually parallel to the substrate surface, as has already been indicated in the diagrammatic cross-sectional view of FIG. 1. The very fine spherical filler particles here ensure good ordering of the mica flakes parallel to the substrate. A layer of this kind not only shows a more distinct metal effect but also exhibits improved scratch resistance and abrasion resistance.

In the case of the exemplary embodiment depicted in FIG. 1, moreover, a sealing layer 20 has been applied to the decorative layer 9. The sealing layer may, for example, comprise silicones, in order to improve the water repellency properties of the coating. Alternatively or in addition, however, the layer 20 may also be an $SiO_2$-based barrier coating. The layer 20 may be applied by sputtering, vapor deposition, plasma-induced chemical vapor-phase deposition or else pyrolytic deposition, such as from flame or corona, for example. An additional sol-gel coating is a further possible example.

With a sealing layer 20 of this kind it is then possible, together with the decorative layer 9, which likewise develops a certain barrier effect, to effectively prevent, for example, the glass-ceramic being attacked by sulfuric acid which forms in the case of gas heating. Lithium aluminosilicate glass-ceramics, among others, can be corroded by sulfuric acid. The invention accordingly not only provides a particularly durable decorative coating but may also enhance the durability of the glass-ceramic as well.

FIG. 4 shows a plan view of the underside 5 of an inventively coated glass-ceramic cooktop. The cooktop has a plurality of heating zones 25, beneath which the heating elements are disposed in the oven. The heating zones may be marked by further decoration on the top face, for example. In this exemplary embodiment, the decorative layer 9 may cover not only the regions which surround the heating zones 25, but also the heating zones 25 of the cooktop themselves.

With the example shown in FIG. 4, the decorative layer 9 may advantageously also have lateral structuring, with regions of the surface of the substrate 3 not having a decorative layer. In the case of the example shown in FIG. 4, this purpose is served by an area 27 which is not coated with the decorative layer. This area 27 may be intended for a sensor array and/or else for a display, which remains visible beneath the cooktop 1 as a result of the absence of the decorative layer 9.

Furthermore, it is also possible for different regions of the surface of the substrate 3 to have been provided with decorative layers which differ in composition and/or appearance and/or color. For example, the decorative layer within the cooking zones 25 may differ in composition, color or appearance from the surrounding regions. This may have, for example, an aesthetic function or else the function of identifying the cooking zones 25.

It is also possible for the optical or physical properties of the coating in the region of the cooking zones 25 to deviate from those of surrounding regions by means of a different layer composition. It may be desirable, for instance, to provide, in the region of the cooking zones 25, a layer 9 which is particularly temperature-stable.

The decorative layer 9 of the invention not only is sufficiently temperature-resistant but is also capable of adequate conduction of the heat, generated by the heating elements, on the cooktop, for cooking. In particular it has been found that even in the hot regions 25 the decorative coating does not alter its visual appearance even after long operation. In addition to the aesthetic impression achieved as a result of coating over the whole area, the coating 9 in the region of the heating zones is also very advantageous for its barrier effect with respect to corrosive gases, such as sulfur oxides which form in the case of gas heating, for instance.

FIG. 5 depicts a variant of the exemplary embodiment shown in FIG. 1. In the case of the coating shown in FIG. 5 as well the decorative layer comprises a plurality of laminae, the decorative layer in this case comprising two laminae 9 and 10, for each of which the formula used was like that used for layer 9 in FIG. 1. Both laminae, 9 and 10, have been produced, accordingly, by application of a paste with a sol-gel binder, fillers and pigments, and subsequent curing. In this context it has proven advantageous in particular for the layer 9 applied first to be cured already before the layer 19 is applied. In particular the layer 9 is fired at a higher temperature of at least 350° C., at 500° C. for example, and the second layer is fired at a lower temperature of not more than 300° C., at 200° C. for example. This double layer avoids holes which may occur in the case of only single application of the mixture, particularly in the case of a paste which is suitable for screenprinting and has corresponding rheological properties.

FIG. 6 shows an electron micrograph of a two-layer decorative layer of this kind. The two layers, 9 and 10, of the decorative layer are readily distinguishable owing to the different orientation of the flakelike pigment particles. The pigment particles of the lower layer 9, or that applied first, exhibit a high degree of orientation as compared with the subsequently applied layer 10. The predominant orientation of the flakelike pigment particles of the first layer 9 parallel to the surface of the substrate 3 produces a luster effect similar to that of the layer shown in FIG. 3.

The thickness of the lower layer, layer 9, is about 6 to 10 micrometers in the exemplary embodiment depicted. The thickness of the further layer, layer 10, is situated in the range from 10 to 15 micrometers. In this exemplary embodiment, layer 9 was fired at 400° C., layer 10 at only 200° C. As a result of the lower firing temperature, organic constituents are retained, and in this way, overall, a hydrophobic coating is produced which at the same time possesses improved resistance to water and oil.

To a skilled worker it is apparent that the invention is not restricted to the exemplary embodiments described above, but instead can be varied in diverse ways. In particular the features of the individual exemplary embodiments can also be combined with one another.

What is claimed is:

1. A glass or glass-ceramic article with decorative coating, comprising a glass or glass-ceramic substrate having a decorative layer;
    wherein the decorative layer comprises a porous, ceramiclike structure with a pigment and a cured sol-gel binder;
    wherein the decorative layer is laterally structured; and
    wherein different regions of the surface of the substrate is provided with decorative layers differing in composition and/or appearance and/or color.

2. The glass or glass-ceramic article as claimed in claim 1, wherein the decorative layer comprises a luminous phosphor.

3. The glass or glass-ceramic article as claimed in claim 1, comprising a multilayer decorative layer.

4. The glass or glass-ceramic article as claimed in claim 3, wherein two or more laminae of the decorative layer comprise the pigment and the cured sol-gel binder.

5. The glass or glass-ceramic article as claimed in claim 1, wherein the decorative layer comprises a layer thickness of not more than 70 micrometers.

6. The glass or glass-ceramic article as claimed in claim 1 is a glass-ceramic cooktop, wherein the decorative layer is disposed on the underside of the cooktop.

7. The glass or glass-ceramic article as claimed in claim 1 is a glass-ceramic cooktop, wherein the decorative layer also covers at least one heating zone of the cooktop.

* * * * *